Aug. 26, 1952 — F. S. ALLINQUANT — 2,608,422

MECHANICAL SEALING MEANS

Filed March 20, 1950 — 2 SHEETS—SHEET 1

Inventor
Fernand Stanislas Allinquant
By Robert E. Burns
Attorney

Aug. 26, 1952     F. S. ALLINQUANT     2,608,422
MECHANICAL SEALING MEANS

Filed March 20, 1950     2 SHEETS—SHEET 2

Inventor
Fernand Stanislas Allinquant
By Robert E. Burns
Attorney

Patented Aug. 26, 1952

2,608,422

UNITED STATES PATENT OFFICE 2,608,422

MECHANICAL SEALING MEANS

Fernand Stanislas Allinquant, Paris, France

Application March 20, 1950, Serial No. 150,593
In France March 30, 1949

3 Claims. (Cl. 286—1)

This invention relates to means for providing a tight seal as between a hollow part and a rod longitudinally slidable therein, and consists of blocking in the longitudinal direction, against the inner wall of said hollow part, the periphery of a washer made of a noncompressible resilient material, such as synthetic rubber, the diameters of said washer in its unstressed condition being respectively greater than the inner diameter of the hollow part and smaller than the diameter of the rod, whereby insertion of the washer into the hollow part and about the rod will cause the washer to expand along its thickness dimension and the internal stress thus created will insure that the pressure exerted by the constituent material of the washer against the inner wall of the hollow part and against the rod will remain substantially constant, even after a certain degree of wear of said material has occurred by friction against the rod.

The invention further includes, as one application of such means, a simple and economical construction for guiding and sealing a piston rod at its point of egress from a cylinder, such construction being particularly designed for use in hydraulic shock-absorbers in motor-car suspension systems.

As an illustration of the invention, various exemplary embodiments will now be described of a sealing device for a piston rod according to the invention, with reference to the accompanying drawings, in which.

Figure 1:
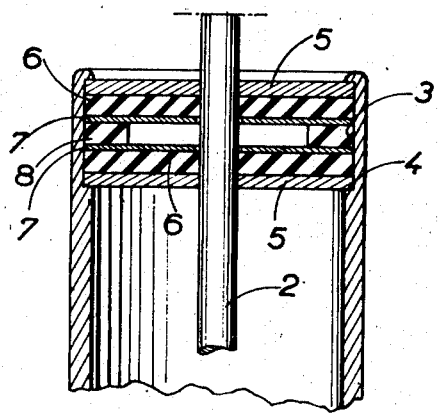
Figure 1 is a partial view in axial cross-section of the end part of a cylinder provided with a device according to the invention.

In the example shown in Figure 1, the cylinder 1 into which the rod 2 extends is in the form of a simple metal tube. The end of this tube is bored or reamed as at 3 over a certain length to a somewhat larger diameter, so as to form a shoulder 4 which serves as a seating for the stack of washers now to be described.

The end washers 5 of this stack, fitted into the bore, are comparatively thick washers made of a soft metal, centrally formed with a hole through which the rod 2 can slide with an easy friction fit and which act to guide said rod axially of the cylinder. In between the washers 5, washers 6 of a resilient material are arranged, and disposed between the washers 6 is a ring of resilient material 8, two discs of metal foil 7 formed with central apertures larger in diameter than the rod being interposed between the respective resilient washers 6 and the adjacent sides of the central ring 8. The washers 6 that are to provide the seal possess when in unstressed condition an outer diameter somewhat greater than that of the bore 3 and an inner diameter somewhat smaller than that of the rod 2. The ring 8 on the other hand is formed with the same diameter as the bore and leaves a wide clearance about the rod 2.

This stack of washers is first positioned on the rod and is then press-fitted into the cylinder end bore 3 in abutment against the shoulder 4, being retained in compressed condition by inwardly crimping the end of the cylinder wall thereover, as shown.

The rod is therefore guided at two spaced points thereof by the metal washers 5 and the seal is provided for by the pressure of the resilient washers 6 against the rod and against the cylinder. This is because the washers 6, on being fitted over the rod and into the cylinder were subjected to a resilient distortion as a result of which they increased in thickness, since, as is known, a resilient material is generally noncompressible. The pressure exerted on the stack on assembly and until crimping has been effected, has caused a resilient distortion of the ring 8 causing it to flatten out. After the sealing washers 6 have undergone some amount of wear as a result of friction against the rod 2, their internal stress tends to restore them to their expanded or relaxed condition by radial expansion and simultaneous reduction in thickness, this reduction in thickness of the washers 6 however being compensated for by the increase in thickness of the ring 8 which tends to return to its initial, unstressed thickness. As a result, the pressure of the stack around its periphery remains constant and the sealing washers remain applied under substantially constant pressure against the rod and the cylinder, so that the sealing function is preserved throughout the wear of the parts.

This very simple device provides permanent mechanical guiding for the rod in the metal washers 5 and constant sealing by the sealing washers 6. The washers are so dimensioned and their distortion on assembly so predetermined as to provide for a suitable margin to compensate for a normal amount of wear. The ring 8 operates as a longitudinal spring adapted to absorb any variations in the thickness dimensions of the seal washers. This ring might accordingly be replaced by any equivalent known means, such as a metal spring or a spring washer.

Figure 2:
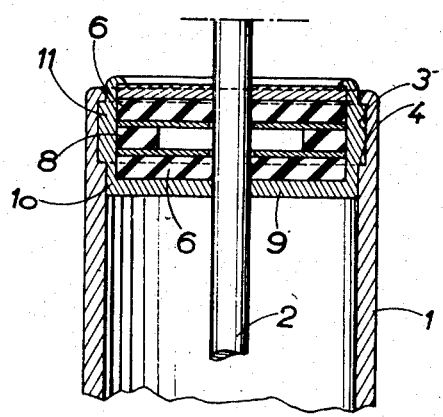
Figure 2 shows a modified form of assembly of said device.

In a modified assembly illustrated in Figure 2, the inner guiding washer is provided by the bottom wall 9 of a casing 10 containing the remaining washers of the stack. The outer wall of said casing is centred in the end of the smaller-diameter operating section of the cylinder and is formed with an annular enlargement 11 fitted into the cylinder end bore 3 and retained in engagement against the shoulder 4 by crimping the cylinder walls over the opposite shoulder of said enlargement; the side wall of the casing is in turn crimped over the stack of washers which includes the other elements described with reference to Figure 3. This modified form of assembly makes it possible to construct the device separately and then subsequently to adapt it to a cylinder.

Figure 3:
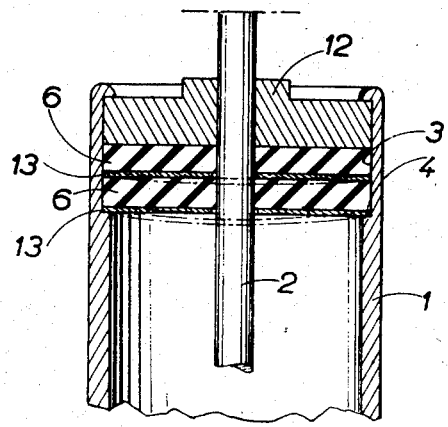
Figure 3 shows a further exemplary embodiment of the device.

In the exemplary embodiment shown in Figure 3, the stack of elements comprises a metal guide bushing 12, arranged for instance at the top of the stack. Both seal washers 6 are retained under this bushing, being spaced from each other and supported inwardly of the cylinder by respective foil elements 13. The assembly is mounted as in the case of Figure 1, the stack being compressed prior to the cylinder end being crimped in. Such compression causes an elastic distortion of the seal washers 6, which flatten out in the peripheral part of the section and compensatingly expand in the central part thereof. This expansion is made manifest by the convex form, inwardly of the cylinder, assumed by the surfaces of the washers and foil elements, as indicated in chain lines in Figure 3. Inasmuch as this distortion is elastic, the washers tend to return to their initial unstressed form, gradually flattening out and expanding radially to compensate for wear as it occurs due to friction against the rod.

The material used in making the seal washers is preferably synthetic rubber. Now synthetic rubber and similar substances do not provide an isotropic medium, so that the pressure exerted on the side surfaces of the washer do not result in a uniform expansion of the thickness thereof and it follows that the faces of the washer will assume a dished form. This results in a distortion of the metal bearing washers confining the resilient washer, and such distortion in turn may impair the mechanical behavior of the device and the desired sealing function.

Figure 4:
Figure 4 illustrates a sealing washer in unstressed condition.
Figure 5:
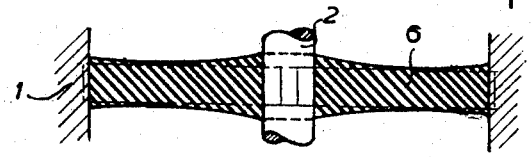
Figure 5 shows the same washer after it has been placed in position in a cylinder bore and over a slidable rod.

In Figure 4 is illustrated a rubber washer 6 in free unstressed condition, which is intended to be mounted as shown in Figure 5 by insertion into the cylinder 1 which has a bore diameter smaller than the outer diameter of said washer, and around the rod 2, larger in diameter than the central hole in the washer. The washer may be positioned in the cylinder bore and about the rod by radially compressing the washer, and the washer, which herein is free from any bearing means for its faces, will be distorted as shown in full lines in Figure 5, its normal unstressed outline being indicated in broken lines in the same figure. The pressure exerted against its side faces causes expansion along the thickness dimension and the resulting thickness will decrease from either (outer and inner) bearing surfaces of the washer towards an intermediate radius thereof, the faces of the washer assuming an annularly dished form.

To make allowance for this distortion, the bearing surfaces of the metal parts that block the washer in its bore may be given a form which is the counterpart of the distorted form of the faces of the rubber washer.

Figure 6:
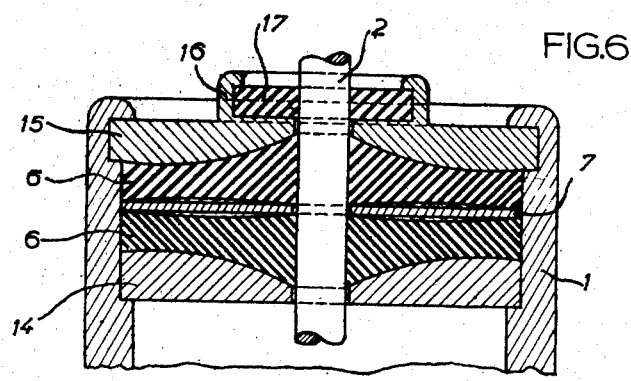
Figure 6 shows another exemplary embodiment of the sealing means.

In the exemplary embodiment illustrated in Figure 6, the sealing device comprises two washers 6, separated by a foil washer 7 formed with a central hole larger than the rod diameter and having their outer faces respectively abutted against the bearing washer 14 inwardly of the bore, and against an outer bearing washer 15. The washers 14 and 15 housed in enlarged sections of the bore are in abutment against the shoulders formed by the reductions in diameter. The outer washer 15 is retained by a crimped flange at the end of the bore and holds the stack of washers in position. It is formed on its outer surfaces with an upstanding flange 16 in which a scraping washer 17 is retained in contact with the rod the end of said upstanding flange being crimped inwardly around the scraper washer.

Each of the washers 14 and 15 provides a seating or bearing surface for the adjacent seal washer 6 in the form of a recessed annular surface, as generated by revolution of a curve corresponding to the over-all axial distortion of the seal ring shown in Figure 5, about the axis of the assembly. Owing to the flexibility of the rubber, this distortion can be provided on only one face of the washer. The seal washers, to comply with this distortion, take support at their inner and outer peripheries against the foil 7, but the shape of the curvature of the bearing surface of washers 14 and 15 is such that a certain amount of clearance remains present in the intermediate part between the washer and the foil.

The internal stresses arising from the radial compression of each washer tend to draw the latter back to its unstressed form and retain it in application against the cylinder and the rod under a certain degree of pressure. Preferably, greater pressure is provided for against the rod, by imparting to the difference in diameter between the central hole and the rod a larger value than to the clearance between the bore and the outer diameter of the washer. When the material constituting the washer, has after some time of operation undergone wear by contact with the rod, such wear is compensated by a radial sliding motion of the resilient material; and a tight seal is maintained as described in connection with the previous embodiments.

Figure 7:
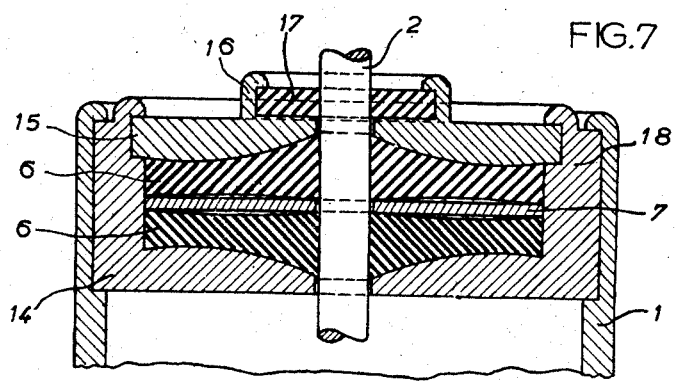
Figure 7 illustrates a modified way of assembling the device of Figure 6.

In a modification of the form of assembly shown in Figure 7, the washer assembly may again be provided in the form of an independent sealing unit ready to be mounted in the end of a cylinder. For this purpose, the inner bearing washer 14 may be extended by a side wall 18 forming adapted or false bores in which the sealing washers 6, 7 and 15 are mounted and its edge is crimped in over the outer bearing washer 15 so as to constitute a solid unit, adapted to be housed in the mouth opening of the cylinder in a portion thereof reamed to a larger diameter than the cylinder bore proper and retained therein by crimping the peripheral edge of the cylinder thereover.

What I claim is:

1. A sealing device between an axial rod and a cylindrical wall, comprising in combination a cylinder having at its opening a part bored at a larger diameter than the diameter proper of the cylinder and forming a shoulder opposite the opening of said cylinder, a rod coaxial to said bored part, two sealing washers of a non-compressible elastic material and an interposed bearing washer of metal, said sealing washers having their outer and inner diameters when free respectively greater than the inner diameter of said bored part and smaller than the diameter of said rod and being inserted on said rod and within said bored part in a radially compressed condition, two rigid metallic washers providing outer abutment surfaces for said sealing washers, said surfaces being shaped as surfaces of revolution generated by rotation about the axis of a curve similar to the axial cross-section assumed by the outer face of said resilient washers as a result of their radial compression, and means clamping said stack of washers against said shoulder.

2. A sealing device according to claim 1, comprising further an upstanding flange formed on the outer surface of the outer end abutment metallic washer, a scraping washer within said flange, contacting said rod and being retained by the inwardly crimped end of said flange.

3. A sealing device between an axial rod and a cylindrical wall, comprising in combination a cylinder having at its opening a part bored at a larger diameter than the diameter proper of the cylinder and forming a shoulder opposite the opening of said cylinder, a rod coaxial with said bored part, a stock of sealing washers of a non-compressible elastic material and interposed elastic bearing washers of metal, said sealing washers having their outer and inner diameters when free respectively greater than the inner diameter of said bored part and smaller than the diameter of said rod and being inserted on said rod and within said bored part in a radially compressed condition, rigid metallic washers providing end abutment surfaces for said stock of washers, said surfaces being shaped as surfaces of revolution generated by rotation about the axis of a curve similar to the axial cross-section assumed by the outer face of the end sealing washers as a result of the radial compression of said sealing washers, and means retaining said stock of washers against said shoulder.

FERNAND STANISLAS ALLINQUANT.

REFERENCES CITED

The following references are of record in the file of this patent:

UNITED STATES PATENTS

| Number | Name | Date |
|---|---|---|
| 2,075,019 | Buck et al. | Mar. 30, 1937 |
| 2,111,200 | Amourelle | Mar. 15, 1938 |
| 2,151,850 | Hedrick et al. | Mar. 28, 1939 |
| 2,182,034 | Von Oberstadt | Dec. 5, 1939 |
| 2,284,424 | Hein | May 26, 1942 |
| 2,399,550 | Klein | Apr. 30, 1946 |